United States Patent
Lin et al.

(10) Patent No.: US 7,485,988 B2
(45) Date of Patent: Feb. 3, 2009

(54) UNINTERRUPTIBLE POWER SUPPLY

(75) Inventors: Hung-Chieh Lin, Taoyuan (TW);
Jen-Chuan Liao, Taoyuan (TW);
Kuo-Chiang Lung, Taoyuan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 124 days.

(21) Appl. No.: 11/328,021

(22) Filed: Jan. 9, 2006

(65) Prior Publication Data

US 2007/0114851 A1    May 24, 2007

(30) Foreign Application Priority Data

Nov. 21, 2005    (TW) ............................... 94140840 A

(51) Int. Cl.
*H02J 7/00* (2006.01)
*H02J 9/00* (2006.01)

(52) U.S. Cl. ........................................ 307/66; 307/64
(58) Field of Classification Search .................. 307/66, 307/64

See application file for complete search history.

(56) References Cited

U.S. PATENT DOCUMENTS 5,982,652 A * 11/1999 Simonelli et al. ........... 363/142

* cited by examiner

*Primary Examiner*—Michael J Sherry
*Assistant Examiner*—Carlos Amaya

(57) ABSTRACT

Disclosed is an uninterruptible power supply including a switch connected between an external power source and a load, a power supply module connected to the external power source and the switch for receiving and converting an input power and supplying converted power to the load, a battery module connected to the power supply module for storing electric power or supplying electric power to the power supply module, a control module connected to the external power source and the battery module and powered by the external power source or the battery module for generating a control signal according to a specific operating status of the power supply module to manipulate the switch so as to supply power to the load through the power supply module or a bypass route, and a display panel connected to and powered through the control module for receiving and displaying system status information from the control module.

9 Claims, 4 Drawing Sheets

UNINTERRUPTIBLE POWER SUPPLY

FIELD OF THE INVENTION

The present invention is related to an uninterruptible power supply, and more particularly to an uninterruptible power supply having a display panel for continuously displaying the system status information of the uninterruptible power supply.

BACKGROUND OF THE INVENTION

During the operation phase of an electronic system, a clean and continual power supply is a sine qua non for maintaining a normal performance. However, the contemporary public electric power supply system is likely to be degenerated by the breakdown and short circuit occurred to the power lines. Therefore, uninterruptible power supply (UPS) has been widely introduced in the client side applications to fix the problems of the abnormalities encountered by the input power side.

FIG. 1 illustrates an elevation view of a conventional standalone uninterruptible power supply according to the prior art. As shown in FIG. 1, a conventional standalone uninterruptible power supply 10 is made up of a display panel 11, a housing 12, a power supply module 13, and a battery module 14, wherein the display panel 11 is mounted on the housing 12 for displaying the system status information of the uninterruptible power supply 10. The housing 12 is configured to receive the power supply module 13 and the battery module 14. The power supply module 13 is the core of the uninterruptible power supply 10, and is made up of a plurality of power conversion elements, including rectifiers, chargers, controllers, inverters, converters, switch devices, and so on. Besides, the power supply module 13 and the battery module 14 are fixedly mounted inside the housing 12.

FIG. 2 illustrates a circuit block diagram of the uninterruptible power supply 10 shown in FIG. 1. In FIG. 2, the solid arrowheaded lines interconnecting circuit blocks represent power lines and the dashed arrowheaded lines interconnecting circuit blocks represent signal lines. As depicted in FIG. 2, the uninterruptible power supply 10 is connected to an external power source 21 and a load 22, and is made up of a display panel 11, a housing 12, a power supply module 13, a battery module 14, and a switch device 15. The display panel 11 is mounted on the housing 12 for displaying the system status information of the uninterruptible power supply 10. The power supply module 13 includes a microcontroller 131 connected to the display panel 11 for providing the system status information of the uninterruptible power supply 10 for display on the display panel 11. The battery module 14 is connected to the power supply module 13 for storing electric power. The switch device 15 is connected between the external power source 21 and the load 22. When the power supply module 13 or the battery module 14 is to be extracted for maintenance, the switch device 15 can be turned on manually so that the external power source 21 can supply electric power to the load 22 through a bypass route (not shown).

Under normal conditions, the uninterruptible power supply 10 enables the power supply module 13 to perform rectification, filtration, and conversion to the input AC power received from the external power source 21 and supply the converted electric power to the load 22. Meanwhile, the power supply module 13 is configured to charge the battery module 14 and supply electric power to the display panel 11. The microcontroller 131 of the power supply module 13 can provide the system status information of the uninterruptible power supply 10 to the display panel 11 for display. During the operation phase of the power supply module 13, the power supply module 13 can store electric power in the battery module 14. When the external power source 21 is malfunctioned or becomes abnormal, the internal switch device of the power supply module 13 (not shown) performs a switching operation to enable the battery module 14 to supply electric power. Under this condition, the power supply module 13 can convert the electric power outputted from battery module 14 and output the converted electric power to the load 22. Meanwhile, the electric power required for powering the display panel 11 is supplied from the power supply module 13, and thereby the display panel 11 can continue displaying the system status information of the uninterruptible power supply 10.

The conventional standalone uninterruptible power supply 10 requires a manual switching operation to shunt the switch device 15 to a bypass route. Hence, when the power supply module 13 is malfunctioned or needs to be repaired, the uninterruptible power supply 10 can not automatically manipulate the switch device 15 to allow the external power source 21 to supply electric power to the load 22 through a bypass route. As a result, the application field of the conventional standalone uninterruptible power supply will be restricted. Besides, the display panel 11 is powered by the power supply module 13 and driven by the microcontroller 131 for displaying the system status information of the uninterruptible power supply 10. When the power supply module 13 is malfunctioned or extracted from the uninterruptible power supply 10 for repair, the power supply module 13 can not power the display panel 11. Under this condition, the display elements of the display panel, for example, LED devices or LCD devices, can not operate for information display, and thus the user is not possible to obtain the operation data and important system information of the uninterruptible power supply, including input voltage, output voltage, battery status, and working temperature.

There is a need to develop an uninterruptible power supply that can continuously display its system status information when its internal power supply module is inoperable or extracted from the housing of the uninterruptible power supply.

SUMMARY OF THE INVENTION

An object of the present invention is to provide an uninterruptible power supply for solving the problem encountered by the conventional uninterruptible power supply that the display panel can not display the system status information of the uninterruptible power supply when the internal power supply module is malfunctioned or extracted from the housing of the uninterruptible power supply.

Another object of the present invention is to provide an uninterruptible power supply that can automatically switch the power supply path to a bypass route when an internal power supply module is malfunctioned or extracted from the housing of the uninterruptible power supply. As a result, the electric power can be continuously supplied to the load and the display panel can resume the display of the system status information of the uninterruptible power supply.

To this end, a broader aspect of the present invention provides an interruptible power supply connected to an external power source and a load, wherein the interruptible power supply includes a switch device connected between the external power source and the load, a power supply module connected to the external power source and the switch device for receiving and converting an input power and supplying the converted power to the load through the switch device, a battery module connected to the power supply module for storing electric power or supplying electric power to the power supply module, a control module connected to the external power source and the battery module and powered by the external power source or the battery module for generating a control signal to manipulate the switching of the switch device according to a specific operating status of the power supply module, so that the electric power can be supplied to the load through the power supply module or a bypass route.

Now the foregoing and other features and advantages of the present invention will be best understood through the following descriptions with reference to the accompanying drawings, wherein:

DETAILED DESCRIPTION OF THE PREFERRED EMBODIMENT

A preferred embodiment embodying the features and advantages of the present invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as limitative.

Figure 1:
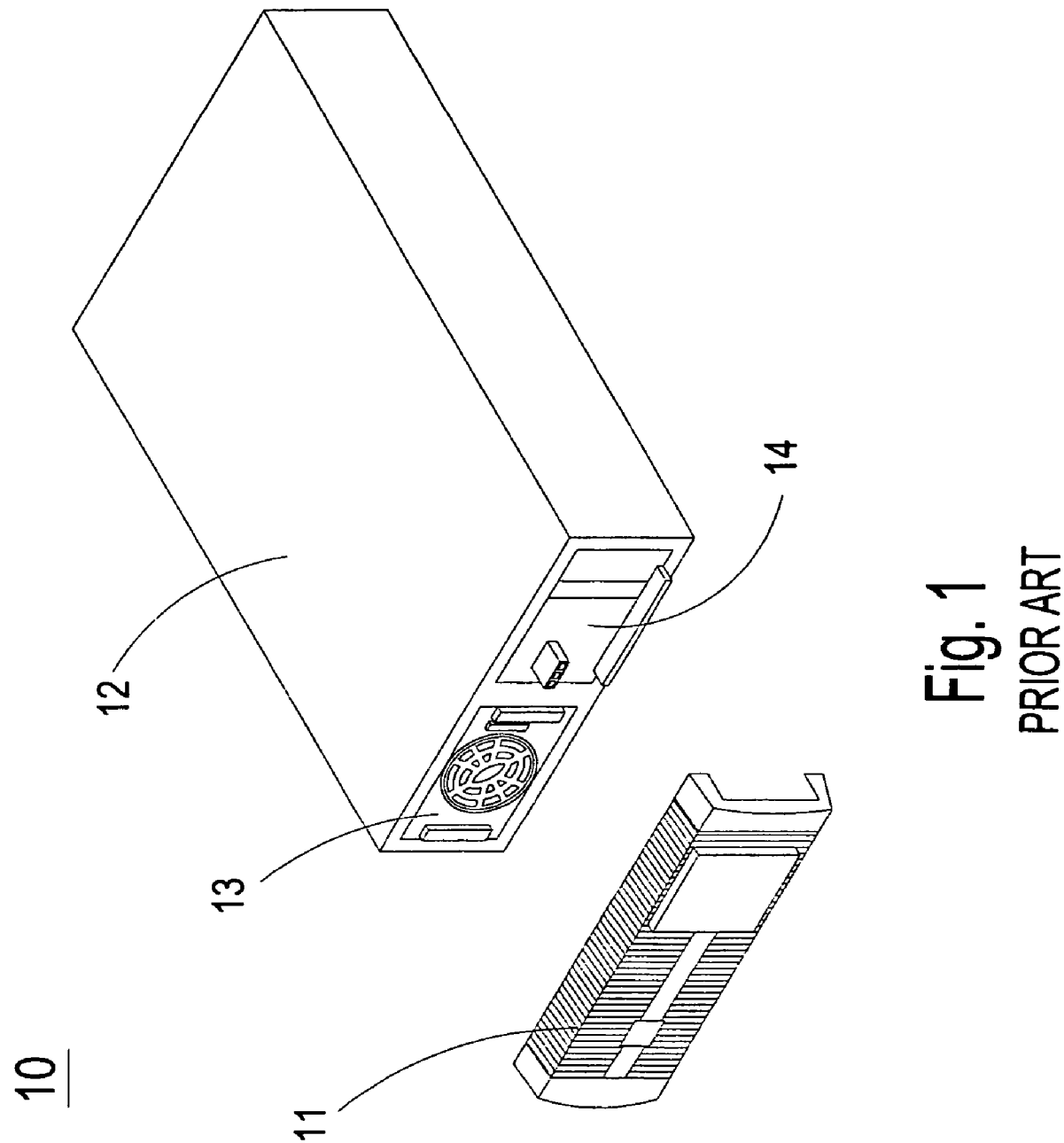
FIG. 1 illustrates an elevation view of a standalone uninterruptible power supply according to the prior art.
Figure 2:
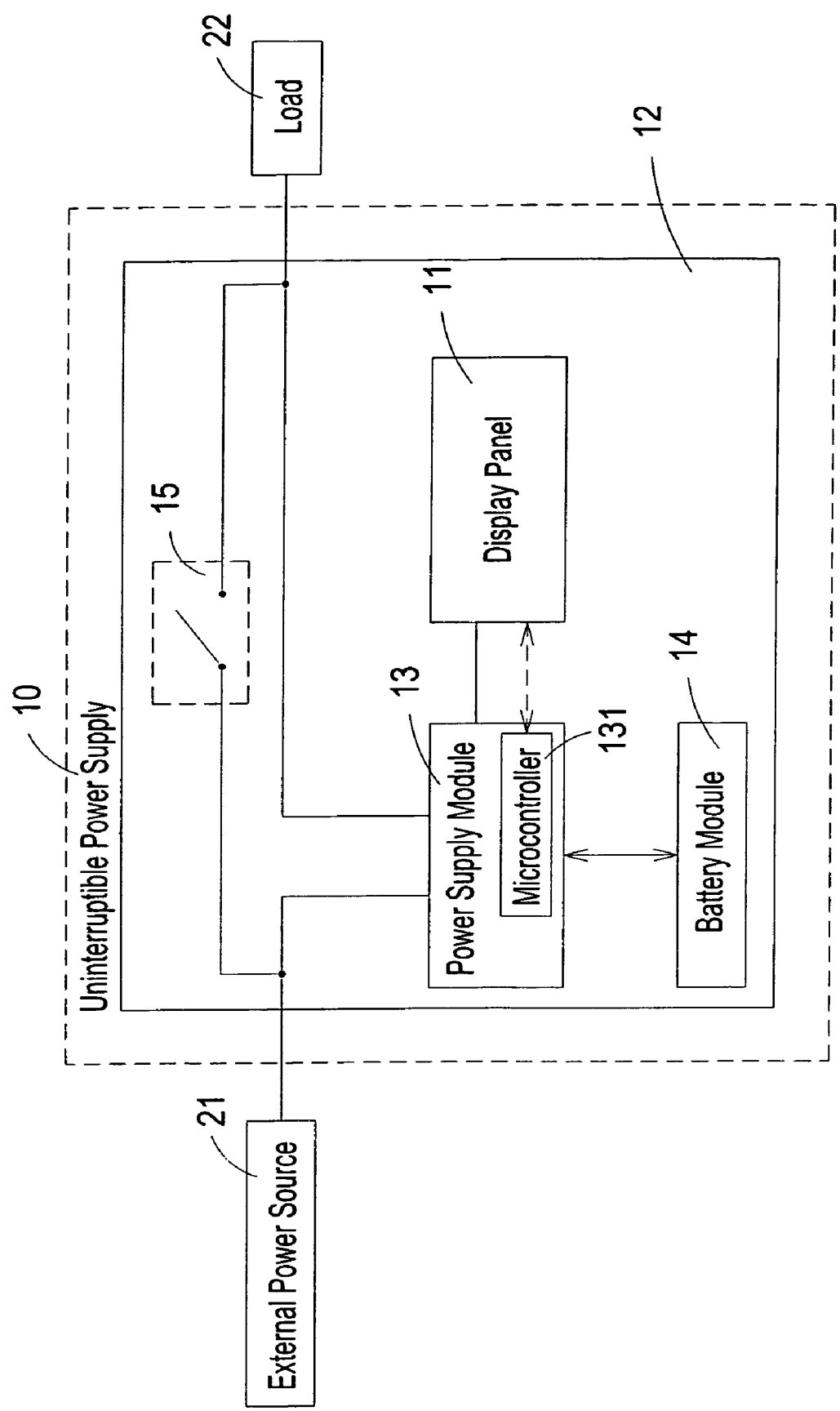
FIG. 2 illustrates a circuit block diagram of a standalone uninterruptible power supply according to the prior art.
Figure 3:
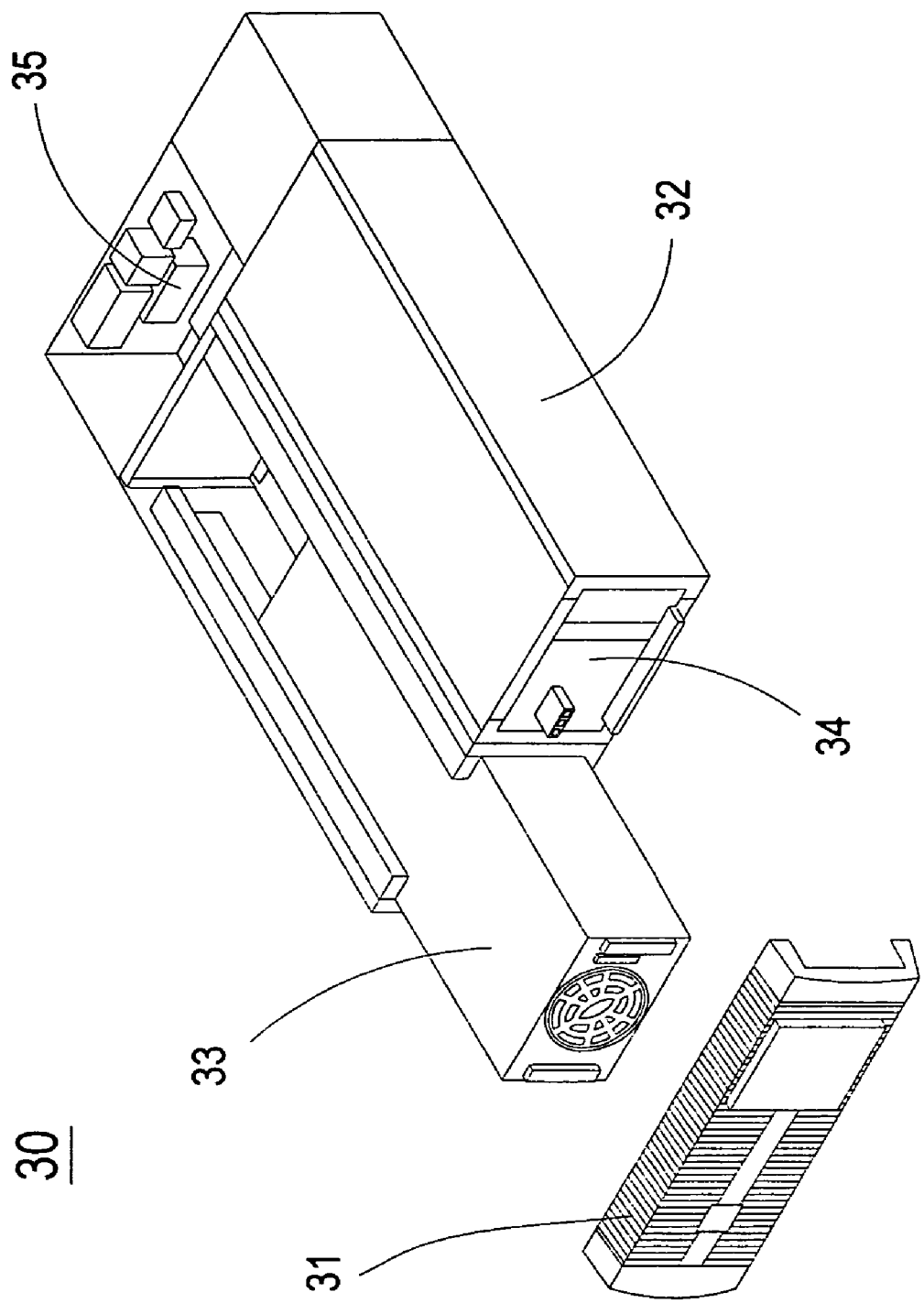
FIG. 3 illustrates an elevation view of a standalone uninterruptible power supply according to a preferred embodiment of the present invention.

FIG. 3 illustrates an elevation view of a standalone uninterruptible power supply according to a preferred embodiment of the present invention. The inventive standalone uninterruptible power supply 30 as shown in FIG. 3 is made up of a display panel 31, a housing 32, a power supply module 33, a battery module 34, a control module 35, and a switch device (not shown in FIG. 3). The display panel 31 is mounted on the housing 32 for displaying the system status information of the uninterruptible power supply 30. The display panel 31 can be detachably or fixedly mounted on the housing 32. The housing 32 is configured to receive the power supply module 33 and the battery module 34, and the modularized power supply module 33 and the battery module 34 are hot swappable within the housing 32. The control module 35 is mounted inside the housing 32 and connected to an external power source 41 and the battery module 34, and powered by the external power source 41 or the battery module 34. The control module 35 is configured to supply electric power to the display panel 31 and the switch device (not shown in FIG. 3). The power supply module 33 is the core of the uninterruptible power supply 30, and is made up of a plurality of power conversion elements, including rectifiers, chargers, controllers, inverters, converters, switch devices, and so on. The battery module 34 is made up of one or more rechargeable batteries (not shown). During the operation phase of the uninterruptible power supply 30, the power supply module 33 and the battery module 34 can be extracted from the uninterruptible power supply 30 without the need of shutting down the uninterruptible power supply 30.

Figure 4:
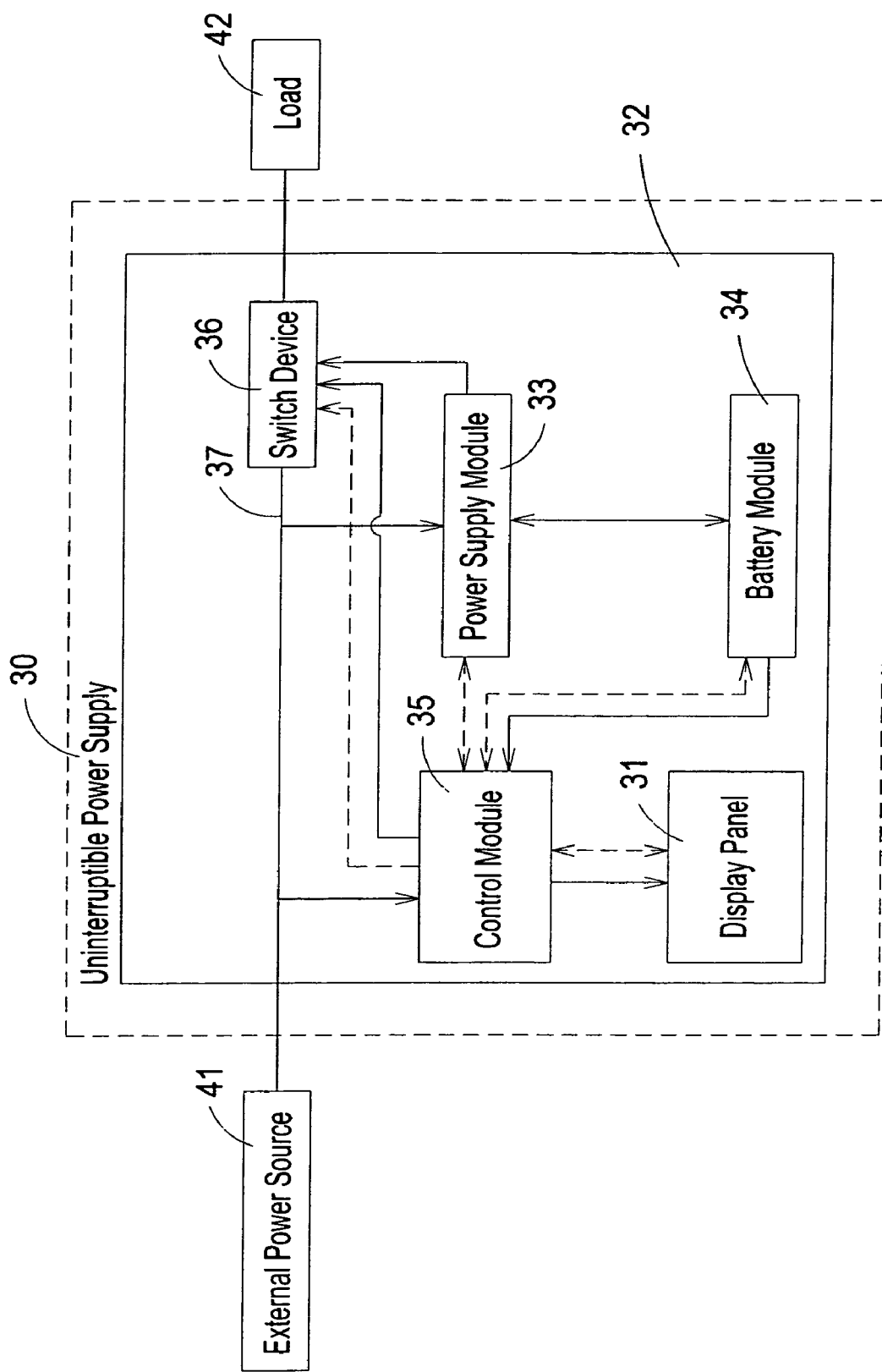
FIG. 4 illustrates a circuit block diagram of a standalone uninterruptible power supply according to a preferred embodiment of the present invention.

FIG. 4 illustrates a circuit block diagram of a standalone uninterruptible power supply system according to a preferred embodiment of the present invention, wherein the solid arrowheaded line interconnecting the circuit blocks represent power lines and the dashed arrowheaded lines interconnecting the circuit blocks represent signal lines. The inventive uninterruptible power supply 30 is connected between the external power source 41 and a load 42, and is made up of a display panel 31, a housing 32, a power supply module 33, a battery module 34, a control module 35, and a switch device 36. The power supply module 33 is connected to the external power source 41 and the switch device 36 for receiving electric power from the external power source 41 and performing rectification, filtration and conversion to the received electric power, and supplying the converted electric power to the load 42 through the switch device 36. On the other hand, the power supply module 33 is also connected to the battery module 34 for charging the battery module 34 and thereby storing electric power in the battery module 34. When the external power source 41 is malfunctioned or becomes abnormal, the battery module 34 can supply electric power to the power supply module 33 to enable the power supply module 33 to boost and convert the electric power supplied from the battery module 34 and supply the converted power to the load 42 through the switch device 36.

In the circuit block diagram of FIG. 4, the switch device 36 is connected between the external power source 41 and the load 42 and connected to the power supply module 33 and the control module 35. The switch device 36 can automatically switch the power supply path by the manipulation of the control module 35, so that the electric power can be supplied to the load 42 through the power supply module 33 or a bypass route 37. The control module 35 is connected to the external power source 41 and the battery module 34 and powered by the external power source 41 or the battery module 34. The control module 35 is also connected to the display panel 31 and the switch device 36 for supplying electric power to the display panel 31 and the switch device 36.

On the other hand, the control module 35 is configured to receive the system status information from the power supply module 33 and the battery module 34 and provide the received information to the display panel 31 for display. Also, the control module 35 can issue a control signal to manipulate the switching of the switch device 36 according to a specific operating status of the power supply module 33, for example, the malfunction of the power supply module 33 or the extraction of the power supply module 33 from the housing 32, so that the electric power can be supplied to the load 42 through the power supply module 33 or the bypass route 37. The display panel 31 is connected to and powered through the control module 35 so as to continuously display the system status information of the uninterruptible power supply 30.

Under normal conditions, the uninterruptible power supply 30 can enable the power supply module 33 to perform rectification, filtration and conversion to the input AC power received from the external power source 41 and supply the converted power to the load 42. Meanwhile, the power supply module 33 can charge the battery module 34. Besides, the control module 35 is connected to and powered by the external power source 41 so that the control module 35 can provide the system status information of the uninterruptible power supply 30 to the display panel 31 for display.

On the other hand, the power supply module 33 can store electric power in the battery module 34 during the operation phase of the power supply module 33. When the external power source 41 is malfunctioned or becomes abnormal, the internal switch device of the power supply module 33 (not shown) performs a switching operation to allow the battery module 34 to supply electric power. Under this condition, the power supply module 33 boosts and converts the electric power supplied by the battery module 34 and supplies the converted electric power to the load 42 through the switch device 36. Meanwhile, the display panel 31 can be powered by the battery module 34 through the control module 35, and can continuously receive the system status information of the uninterruptible power supply 30 from the control module 35, so that the system status information of the uninterruptible power supply 30 can be displayed without interruption.

Besides, when it is desired to extract the power supply module 33 from the housing 32 of the uninterruptible power supply 30 for repair or replacement, the control module 35 can issue a control signal to the switch device 36 so as to automatically switch the power supply path to the bypass route 37. Meanwhile, the uninterruptible power supply 30 can receive electric power from the external power source 41 and supply the received electric power to the load 42 through the bypass route 37. Under this condition, the control module 35 of the uninterruptible power supply 30 is still connected to the external power source 41, and thus the external power source 41 can supply electric power to the control module 35 so that the display panel 31 and the switch device 36 can be powered without interruption. In this manner, the display panel 31 can be supplied with sufficient power to continuously display the system status information received from the control module 35, such as the input voltage, output voltage, and working temperature.

In summary, the inventive standalone uninterruptible power supply 30 allows the control module 35 to be independent of the power supply module 33, and thus the power supply path can be switched to the bypass route 37 so as to continuously supply electric power to the load 42 when the power supply module 33 is malfunctioned or extracted from the housing 32. On the other hand, the display panel 31 is connected to the control module 35 which can be powered by the external power source 41 or the battery module 34. When the power supply module 33 is malfunctioned or extracted from the housing 32, the system status information of the uninterruptible power supply 30 can be displayed without interruption.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An uninterruptible power supply connected to an external power source and a load, comprising:
   a switch device connected between the external power source and the load;
   a power supply module connected to the external power source and the load for receiving and converting the electric power received from the external power source and supplying a converted electric power to the load through the switch device;
   a battery module connected to the power supply module for storing electric power or supplying electric power to the power supply module;
   a control module connected to the external power source and the battery module and powered by the external power source or the battery module for generating a control signal according to a specific operating mode of the power supply module to manipulate the switching device such that the electric power is supplied to the load through the power supply module or a bypass route, and the control module connected to the switch device for providing power to the switch device; and
   a display panel connected to and powered through the control module for receiving a system status information of the uninterruptible power supply from the control module and displaying the system status information of the uninterruptible power supply.

2. The uninterruptible power supply according to claim 1 wherein the power supply module is configured to convert the electric power received from the external power source and supply a converted electric power to the load through the switch device when the external power supply is operating normally.

3. The uninterruptible power supply according to claim 2 wherein the power supply module is configured to charge the battery module when the external power supply is operating normally.

4. The uninterruptible power supply according to claim 3 wherein the control module is configured to be powered by the external power supply and provide the system status information to the display panel when the external power supply is operating normally.

5. The uninterruptible power supply according to claim 1 wherein the battery module is configured to supply electric power to the power supply module when the external power supply is malfunctioned or becomes abnormal.

6. The uninterruptible power supply according to claim 1 wherein the control module is configured to be powered by the battery module and provide the system status information of the uninterruptible power supply when the external power supply is malfunctioned or becomes abnormal.

7. The uninterruptible power supply according to claim 1 wherein both of the power supply module and the battery module are hot swappable.

8. The uninterruptible power supply according to claim 7 wherein the control module is configured to manipulate the switch device to supply the electric power received from the external power source to the load through the bypass route and the switch device when the power supply module is malfunctioned or extracted from the uninterruptible power supply.

9. The uninterruptible power supply according to claim 8 wherein the control module is configured to be powered by the external power supply and supply electric power to the display panel and the switch device when the power supply module is malfunctioned or extracted from the uninterruptible power supply.

* * * * *